(12) United States Patent
Coutarel et al.

(10) Patent No.: US 6,889,717 B2
(45) Date of Patent: May 10, 2005

(54) FLEXIBLE CONDUIT WITH PRESSURE VAULT INTERLOCKED FROM BELOW

(75) Inventors: Alain Coutarel, Mont Saint Aignan (FR); François Dupoiron, Barentin (FR); Philippe Espinasse, Bihorel (FR); Louis Patrice Joël Jung, La Mailleraye sur Seine (FR)

(73) Assignee: Technip France (FR)

( * ) Notice: Subject to any disclaimer, the term of this patent is extended or adjusted under 35 U.S.C. 154(b) by 116 days.

(21) Appl. No.: 10/478,261
(22) PCT Filed: May 6, 2002
(86) PCT No.: PCT/FR02/01551
§ 371 (c)(1), (2), (4) Date: Nov. 17, 2003
(87) PCT Pub. No.: WO02/095280
PCT Pub. Date: Nov. 28, 2002

(65) Prior Publication Data
US 2004/0154677 A1 Aug. 12, 2004

(30) Foreign Application Priority Data
May 18, 2001 (FR) .............................. 01 06558

(51) Int. Cl.$^7$ ................................. F16L 11/16
(52) U.S. Cl. ....................... 138/135; 138/138
(58) Field of Search .................. 138/130, 135, 138/138; 428/36.91

(56) References Cited
U.S. PATENT DOCUMENTS

| | | | | |
|---|---|---|---|---|
| 1,055,263 A | * | 9/1913 | Fischer ........................ | 138/131 |
| 4,549,581 A | | 10/1985 | Unno et al. | |
| 5,275,209 A | * | 1/1994 | Sugier et al. ............... | 138/135 |
| 5,730,188 A | | 3/1998 | Kalman | |
| 5,813,439 A | | 9/1998 | Herrero et al. | |
| 6,065,501 A | * | 5/2000 | Feret et al. .................. | 138/134 |
| 6,098,667 A | * | 8/2000 | Odru ........................... | 138/134 |
| 6,253,793 B1 | * | 7/2001 | Dupoiron et al. ........... | 138/135 |
| 6,283,161 B1 | * | 9/2001 | Feret et al. .................. | 138/134 |
| 6,338,365 B1 | * | 1/2002 | Odru ........................... | 138/134 |
| 6,354,333 B1 | * | 3/2002 | Dupoiron et al. ........... | 138/135 |
| 6,378,193 B1 | * | 4/2002 | du Chaffaut et al. ......... | 29/505 |
| 6,739,355 B2 | * | 5/2004 | Glejbøl et al. .............. | 138/135 |
| 2002/0157723 A1 | * | 10/2002 | Odru ........................... | 138/135 |

FOREIGN PATENT DOCUMENTS

| | | |
|---|---|---|
| EP | 431142 | 12/1992 |
| FR | 2 727 738 | 6/1996 |
| FR | 2 782 141 | 2/2000 |
| FR | 2 783 142 | 3/2000 |

OTHER PUBLICATIONS

International Search Report, Sep. 2002, PCT/FR02/01551.

* cited by examiner

Primary Examiner—James Hook
(74) Attorney, Agent, or Firm—Ostrolenk, Faber, Gerb & Soffen, LLP

(57) ABSTRACT

A flexible tubular pipe comprising at least, from the inside outwards, an internal sealing sheath made of a polymer material, a cylindrical pressure vault having an external face and having an internal face placed over the internal sheath. The vault is a winding, in a helix with a short pitch and with a gap between turns, of an interlocked metal profile wire. At least one ply of tensile armour layers is wound with a long pitch. An external protective sealing sheath is made of a polymer. The fastener wire has the same height as the profile wire and is fastened below the neutral fiber of the profile wire. The ratio of the cross section of the profile wire to the cross section of the fastening wire is between 1 and 2 and the ratio of the moment of inertia $I_{yy}$ of the profile wire to the moment of inertia $I_{yy}$ of the fastening wire is between 1 and 2.

13 Claims, 3 Drawing Sheets

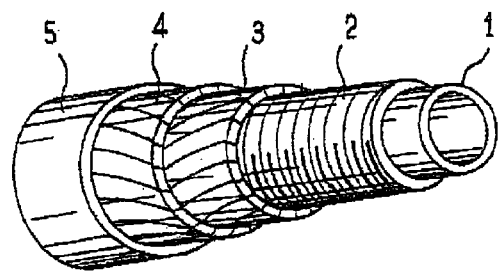
FIG_1
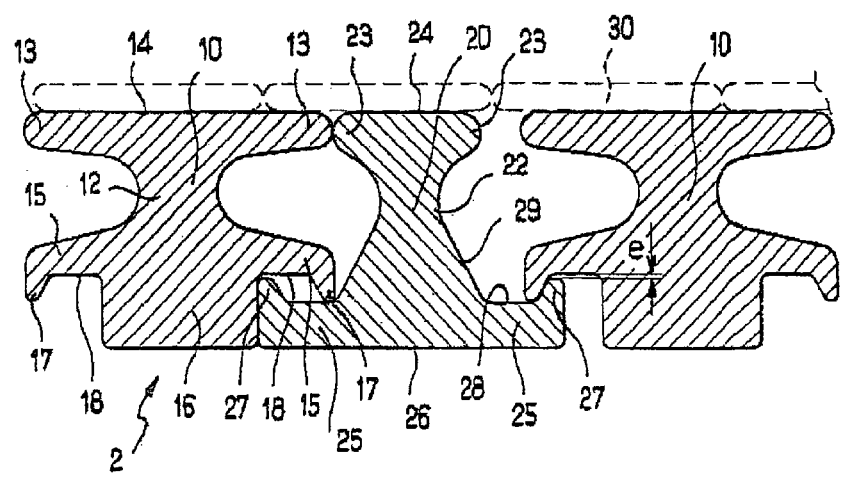
FIG_2

FLEXIBLE CONDUIT WITH PRESSURE VAULT INTERLOCKED FROM BELOW

BACKGROUND OF THE INVENTION

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It is known that there are, on the one hand, bottom pipes, called flow lines, that is to say flexible pipes which are unwound from a barge in order to be laid generally on the bottom of the sea and connected to the subsea installations, such pipes working mainly in static mode, and, on the other hand, rising columns, called risers, that is to say flexible pipes which are unwound from a surface installation such as a platform and are connected to the subsea installations and most of which do not lie on or below the seabed, such pipes working essentially in dynamic mode. The invention relates more particularly to pipes working in dynamic mode.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the standards API 17 B and API 17 J drawn up by the American Petroleum Institute under the title "Recommended Practice for Flexible Pipe".

A flexible pipe generally comprises, from the inside outwards:

an internal sealing sheath made of a plastic, generally a polymer, resistant to a greater or lesser extent to the chemical action of the fluid to be transported;

a pressure vault resistant mainly to the pressure developed by the fluid in the sealing sheath and consisting of the winding of one or more interlocked metal profile wires (which may or may not be self-interlockable) wound in a helix with a short pitch around the internal sheath;

at least one ply (and generally at least two crossed plies) of tensile armour layers whose lay angle measured along the longitudinal axis of the pipe is less than 55° C.; and an external protective sealing sheath made of a polymer.

Such a structure is that of a pipe with a so-called smooth bore. In a pipe with a so-called rough bore, a carcass consisting of an interlocked metal strip is also provided inside the internal sealing sheath, serving to prevent the pipe collapsing under external pressure.

The pressure vault consists of a winding of non-touching turns so as to give the pipe a degree of flexibility. The expression "non-touching turns" is understood to mean turns between which a certain space or interstice, called hereafter "gap", is left, which gap may be greater the larger the wound profile wire.

There are two types of pressure vault:

pressure vaults for static applications;

pressure vaults for dynamic applications.

For static applications, the pressure vaults only have to withstand the internal and external pressures. They are not subjected to the fatigue caused by the rubbing due to dynamic stressing. In this case, vault wires with any type of interlocking may be used. The wire (cross section and inertia) is selected according to the internal and external pressures.

For dynamic applications, such as those mainly intended by the invention, the pressure vaults must withstand, in addition to the internal and external pressures, large stresses due to dynamic stressing. These stresses are due to contacts between the wires constituting the vault. These contacts cause rubbing which, combined with the large bearing pressures, result in a reduction in the lifetime of the profile wires by fatigue cracking.

This problem is encountered, for example in the pipe known from U.S. Pat. No. 4,549,581 which shows the interlocking by U-shaped fasteners of the U-shaped wires from below. These fasteners are too weak to withstand the dynamic stressing. In fact, such a fastener withstands only little stress by itself; it bends and bears on the outline of the profile wire. This results in bending moments and therefore alternating stresses, of greater or less magnitude according to the position and therefore of the level of dynamic stressing. In this case, the behaviour under dynamic conditions depends on the initial position of the profile wire with respect to the fastener and on the level of dynamic stressing, and therefore on the magnitude of the waves. The cross sections and the characteristics of the material must be adjusted according to the levels of severity. This type of interlocking considerably limits the performance of the pressure vault in dynamic applications.

This is why the Applicant has already proposed in document FR 2 727 738 to raise the fastening region into the upper portion of the pressure vault. Since the interlocking is carried out from above, the fastener is little exposed to the internal pressure (which is taken up by the profile, in this case "teta", wire) and to the amplitudes of displacement due to the dynamic stressing.

According to document EP 0 431 142, which also relates to a pressure vault with a "teta" profile wire, the interlocking is done approximately level with the neutral fibre.

In Patent U.S. Pat. No. 5,730,188, it has been proposed, in order to improve the fatigue resistance in dynamic mode of "zêta" wires, to raise the interlocking region into the upper portion of the vault and to make a chamfer on the upper flange of the wire. This profile wire makes it possible to limit contacts in the interlocking region and thus increases the fatigue resistance of the pressure vault.

The Applicant has also proposed in document FR 2 783 142 to use a lightened profile wire of large moments of inertia, in the form of an I, which, for dynamic applications, is also interlocked from above.

It may therefore be seen that, for dynamic applications, a consensus has been established whereby the profile wire is interlocked exclusively from above.

For deepsea applications, it is sought to have moment of inertia at the pressure vault so as also to withstand the external pressure. In this case, the profile wire constituting the vault has a relatively large height which, in a dynamic application with interlocking from above, creates a large gap. The internal sheath may creep into this large volume due to the effect of temperature and of the internal pressure, which results either in damage to the sheath or in disruption to the interlocking of the pressure vault. This problem may be alleviated by providing the pressure sheath with additional thickness, but that increases the cost of this sheath.

This is why the Applicant has also proposed, in document FR 2 782 141, anti-creep devices to mask these gaps. However, the use of these devices increases the cost of manufacturing these pressure vaults.

SUMMARY OF THE INVENTION

The object of the invention is to provide a pipe whose pressure vault is well suited to withstanding deepsea dynamic stressing, without having the drawbacks of the known pipes.

The present invention achieves its objective by means of a flexible tubular pipe of the rough-bore or smooth-bore type, that is to say comprising at least, from the inside outwards, an internal sealing sheath made of a polymer material, a cylindrical pressure vault having an external face and an internal face placed over the internal sheath, the vault consisting of the winding, in a helix with a short pitch and with a gap between turns, of a metal profile wire interlocked from below by a fastener wire, at least one ply of tensile armour layers wound with a long pitch and an external protective sealing sheath made of a polymer, characterized in that the fastener wire has substantially the same height as the profile wire and is interlocked, with no nominal radial contact, below the neutral fibre of the wire (that is to say the fibre where there is no elongation during spiralling, at the centre of mass of the cross section of the wire). The expression "with no nominal radial contact" is understood to mean that the profile wire and the fastener wire are shaped with a nominal radial clearance at their interlocking regions. In practice, the interlocking region, defined by the mean plane of the interlocking, is located at the level of the lower ⅓ of the height of the profile wire and of the fastener wire, or lower. This interlocking from below makes it possible to avoid the problem of the internal sheath creeping. The height and the cross section of the fastener wire contributes to the lack of radial contact between the fastener wire and the profile wire; consequently, the fastener wire absorbs and transmits the pressure stresses to the outside of the vault. The fastener wire is dimensioned so as to allow it to withstand the stresses due to the internal pressure without the contribution of the profile wire; thus, there is no substantial transmission of stresses to the interlocking projections. It is advantageous for the cross section of the fastener wire to be similar to the cross section of the profile wire. In practice, the ratio of the cross section of the profile wire to the cross section of the fastener wire is between 1 and 2 (and preferably between 1 and 1.6), whereas in the prior art this ratio is greater than 2 and very often greater than 4 or 5. Likewise, the ratio of the moment of inertial $I_{yy}$ of the profile wire to the moment of inertia $I_{yy}$ of the fastener wire is advantageously between 1 and 2, thereby allowing the mean moment of inertia of the pressure vault not to be too greatly reduced compared with that of the profile wire alone. Advantageously, the height of the fastener wire is the same or approximately the same as the height of the profile wire. This makes it possible to have a constant outside diameter and a better distribution of the stresses.

Advantageously, for a pipe used as a riser, a thin hoop reinforcement layer is wound on top of the pressure vault, at the top of the riser.

The invention is applicable to several kinds of wire cross sections. However, it is advantageous for the profile wire of the pressure vault to have a slimmed-down, I-shaped cross section, and in particular a cross section in the derived form of a "psi" ψ. The fastener wire advantageously has a T-shaped cross section.

The invention will be more clearly understood with the aid of the description which follows, with reference to the appended schematic drawings showing, as examples, embodiments of the flexible pipe according to the invention. Further advantages and features will become apparent on reading the description.

BRIEF DESCRIPTION OF THE DRAWINGS

FIG. 1 is a schematic perspective view showing the successive layers of a pipe (in this case of the smooth-bore type) to which the invention applies.

FIG. 2 is a partial view in longitudinal section of the pressure vault of a flexible pipe according to the invention, with a "psi"-shaped profile wire.

DESCRIPTION OF PREFERRED EMBODIMENTS

Figure 3:
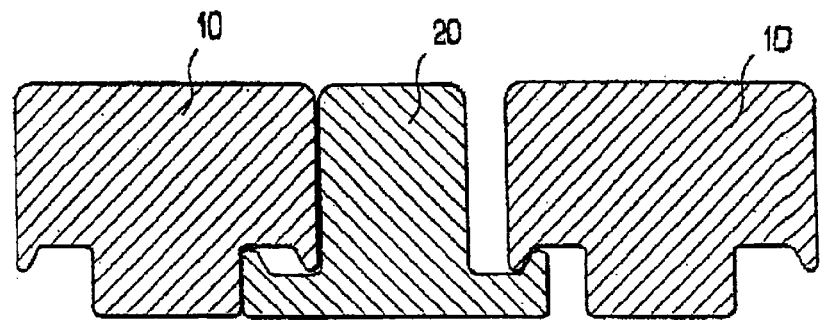
FIGS. 3 and 4 illustrate two alternative embodiments of pressure vaults according to the invention.

As FIG. 1 shows, and in general, a pipe of the smooth-bore type comprises, from the inside outwards, a polymeric internal sealing sheath 1, a metal vault 2 consisting of the winding of at least one interlocked metal profile wire in a helix, an armour layer resistant to the axial tension in the longitudinal direction of the pipe and usually consisting of one or more pairs of crossed plies 3, 4 wound in opposite directions, and a polymeric external sealing sheath 5. Other layers (not shown) may be provided, depending on the type and the application of the pipe, such as, for example, an internal carcass underneath the internal sealing sheath 1 (for rough-bore pipes), a hoop reinforcement layer consisting of a winding with a short pitch of a rectangular wire, interposed between the pressure vault 2 and the first armour ply 3, and intermediate sheaths placed between various armour plies.

Figure 4:
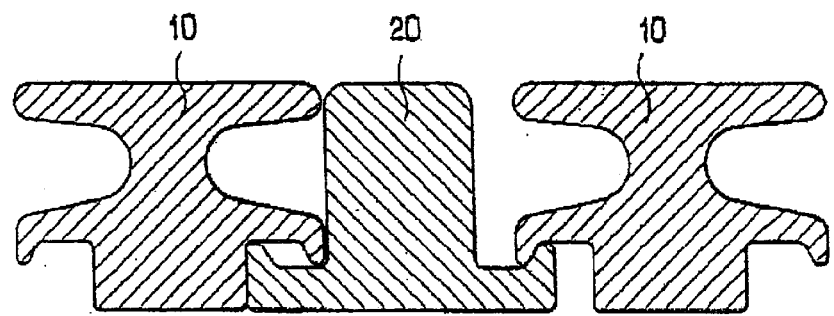
Figure 5:
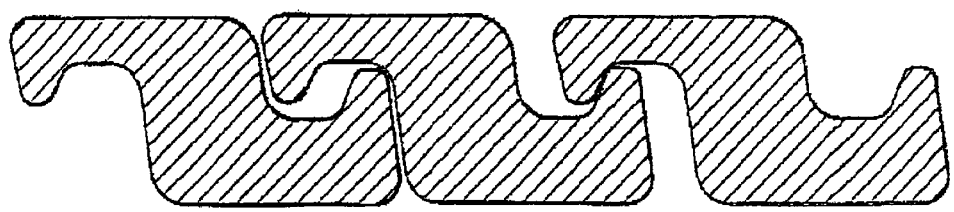
FIGS. 5 to 8 illustrate pressure vaults known from the prior art.
Figure 6:
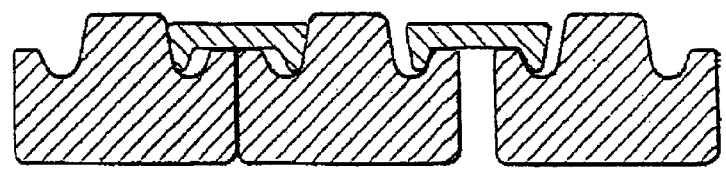
Figure 7:
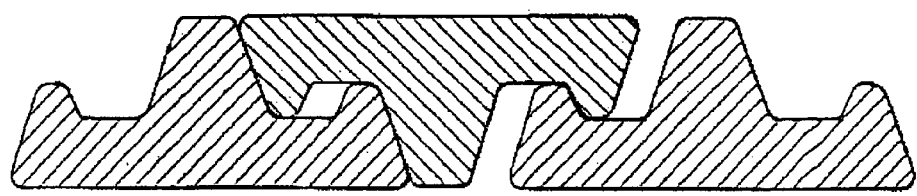
Figure 8:
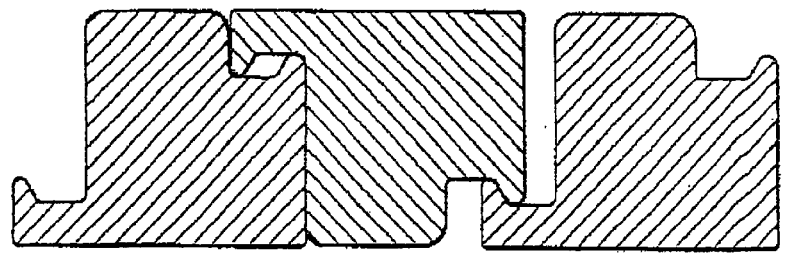

FIGS. 5 to 8 show known pressure vaults from the prior art. FIG. 5 shows an unsymmetrical "zeta" profile wire with self-interlocking from above, FIG. 6 shows a "teta" profile wire interlocked by a U from above, FIG. 7 shows a self-interlocking T-shaped profile wire and FIG. 8 shows a profile wire whose interlocking regions are unsymmetrical. The problem with all these pressure vaults is creep into the gaps. It is this problem that the invention shown in FIGS. 2 to 4 solves.

As shown in FIG. 2, the pressure vault 2 consists of a winding of a "psi"-shaped profile wire 10 interlocked by a fastener wire 20. The fastener wire 20 has in this case approximately the same height as the profile wire 10 and both are shaped so as to avoid any radial contact between the fastener wire and the profile wire in the normal situation, so as to avoid cracking at the interlocking projections.

The profile wire 10 has a profile in the form of an upside-down "psi", consisting of a web 12, relatively wide external flanges 13 (that is to say flanges turned towards the outside of the pipe) forming a straight base 14 (a straight base in cross section, therefore corresponding to a cylindrical curved surface) and internal flanges 15 separated by a central block 16. The internal flanges 15 terminate in an interlocking rim or projection 17 facing the inside of the pipe and separated from the central block 16 by a straight flange bottom region 18.

The fastener wire 20 has a profile also consisting of a web 22, relatively short external flanges 23 forming a straight base 24 and internal flanges 25 forming a straight base 26. The internal flanges 25 terminate in an interlocking rim or projection 27 facing the outside of the pipe and separated by a straight flange bottom region 28 from an inclined portion 29 for joining to the web 22.

The widths of the flange bottoms 18, 28 are approximately equal and allow positional movement between the profile wire 10 and the fastener wire 20, between a position of attachment (between the left-hand part of the profile wire 10 in FIG. 2 and the fastener 20) and a position of separation (between the right-hand part of the profile wire 10 in FIG. 2 and the fastener 20).

The height of the central block 16 with respect to the flange bottom 18 defines the upper limit of the interlocking region and is less than or equal to one third of the height of the profile wire (for example in this case 6.4 mm for a profile wire height of 21 mm).

The difference in height between the central block 16 and the interlocking projection 27 leaves a clearance "e", avoiding contact and wear by rubbing. If, as a result of the dimensional variations owing to the tolerances, the deformations and the laying operation, etc., contacts do initially appear, they disappear with wear. Even in the case of contacts, the fastener wire practically does not work in bending, because of its design, and the alternating stresses are generated only by the rubbing, that is to say by very point-like applications of pressure. The stresses are therefore always of the same level (with constant friction coefficient and pressure) whatever the level of dynamic stressing, which is completely different from the solutions of the prior art. Consequently, the fatigue behaviour of the fastener will be considerably less sensitive to the initial position of the profile wire (contact) and to the variations in dynamic stressing.

The width of the outer base 14 of the profile wire (for example 28.6 mm) is approximately equal to the width of the inner base 26 of the fastener wire (for example 29 mm) and the width of the inner block 16 (for example 14 mm) is approximately equal to the width of the outer base 24 of the fastener (for example 14.2 mm) so as to balance the internal and external pressures.

In the embodiment shown, the moment of inertia $I_{xx}$ and the moment of inertia $I_{yy}$ of the profile wire are 14536 mm$^4$ and 15165 mm$^4$ respectively and those of the fastener wire are 13035 mm$^4$ and 11319 mm$^4$ respectively. The respective areas of a cross section of the profile wire and of the fastener wire are 356.3 mm$^2$ and 289.3 mm$^2$. It may be seen in this example that the ratio of the moments of inertia $I_{yy}$ or the ratio of the areas of a cross section of the profile wire with respect to those of the fastener wire are close to 1.

FIGS. 3 and 4 show two alternative embodiments of a pressure vault according to the invention.

According to FIG. 3, the profile wire 10 has a "teta"-shaped profile interacting with a T-shaped fastener wire (with no recesses) interlocked, from below, under a third of the height of the vault. The area and the moment of inertia $I_{yy}$ of the profile wire 10 are in this case substantially greater than those of the fastener wire 20, however they are in a ratio of less than 2.

According to FIG. 4, the profile wire 10 has been "slimmed down" in order to give it a "psi" shape so that it moment of inertia is similar to that of the fastener wire 20, the latter being identical wire in FIG. 3.

At the top of a riser, the internal pressure is very much greater than the external pressure. The pressure vault must absorb large stresses which, combined with the dynamic stressing, may cause fatigue problems in this region of the riser. To alleviate this problem, a first solution is to give some cross section to the profile wire and to the fastener wire, as proposed in FIGS. 3 and 4. Another solution is to wind over the top of the pressure vault a hoop reinforcement 30 of very small thickness compared with the vault, as shown by dashed lines in FIG. 2. The thickness is around 5 mm. This hoop reinforcement layer 30 may be introduced only at the top of the riser (where it is needed) and may be replaced elsewhere with a plastic filling or not be replaced at all. Another advantage of this solution is that the hoop reinforcement can be used to limit the creep of any anti-collapse sheath on top of the pressure vault.

What is claimed is:

1. Flexible tubular pipe comprising from the inside outwards at least, an internal sealing sheath of a polymer material, a cylindrical pressure vault having an external face and having an internal face placed over the internal sheath, the vault comprising a winding in a helix with a short pitch and with a gap between successive turns of the winding, a metal profile wire with successive turns interlocked from below by a fastener wire, at least one ply of tensile armour layers wound with a long pitch, and an external protective sealing sheath made of a polymer, the fastener wire has substantially the same height as the profile wire, the profile wire and the fastener wire being interlocked, with no nominal radial contact, at most to one third of the height of the profile wire; and the ratio of a cross section of the profile wire to a cross section of the fastener wire is between 1 and 2.

2. Pipe according to claim 1, wherein the ratio of the cross section of the profile wire to the cross section of the fastener wire is less than 1.6.

3. Pipe according to claim 1, wherein the wires have respective moments of inertia and the ratio of the moment of inertia $I_{yy}$ of the profile wire to the moment of inertia $I_{yy}$ of the fastener wire is between 1 and 2.

4. Pipe according to claim 1, further comprising a thin hoop reinforcement wound on top of the pressure vault.

5. Pipe according to claim 1, wherein the cross section of the profile wire is "psi" shaped.

6. Pipe according to claim 2, wherein the wires have respective moments of inertia and the ratio of the moment of inertia $I_{yy}$ of the profile wire to the moment of inertia $I_{yy}$ of the fastener wire is between 1 and 2.

7. Pipe according to claim 2, further comprising a thin hoop reinforcement wound on top of the pressure vault.

8. Pipe according to claim 3, further comprising a thin hoop reinforcement wound on top of the pressure vault.

9. Pipe according to claim 6, further comprising a thin hoop reinforcement wound on top of the pressure vault.

10. Pipe according to claim 2, wherein the cross section of the profile wire is "psi" shaped.

11. Pipe according to claim 3, wherein the cross section of the profile wire is "psi" shaped.

12. Pipe according to claim 4, wherein the cross section of the profile wire is "psi" shaped.

13. Pipe according to claim 6, wherein the cross section of the profile wire s "psi" shaped.

* * * * *